US011423734B2

(12) United States Patent
Rodriguez et al.

(10) Patent No.: US 11,423,734 B2
(45) Date of Patent: Aug. 23, 2022

(54) FLEXIBLE DISPLAY FOR USE WITH ONE OR MORE ELECTRONIC GAMING MACHINES

(71) Applicant: Aristocrat Technologies, Inc., Las Vegas, NV (US)

(72) Inventors: Frank Rodriguez, Las Vegas, NV (US); Stephen Shaffer, Jr., Las Vegas, NV (US); Xiaoqiang Gong, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 90 days.

(21) Appl. No.: 16/929,902

(22) Filed: Jul. 15, 2020

(65) Prior Publication Data

US 2021/0027574 A1 Jan. 28, 2021

Related U.S. Application Data

(60) Provisional application No. 62/878,145, filed on Jul. 24, 2019.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| ***G07F 17/34*** | (2006.01) |

(52) U.S. Cl.

CPC .......... *G07F 17/3211* (2013.01); *G07F 17/34* (2013.01)

(58) Field of Classification Search

USPC .............................. 463/1, 20, 22, 30, 31, 39

See application file for complete search history.

(56) References Cited

U.S. PATENT DOCUMENTS

| | | | | |
|---|---|---|---|---|
| 8,047,916 B2 * | 11/2011 | Seelig | G07F 17/3211 463/31 |
| 8,591,330 B2 * | 11/2013 | Kelly | G07F 17/3209 463/31 |
| 9,147,313 B2 * | 9/2015 | Nelson | G07F 17/3225 |
| 2008/0076569 A1 * | 3/2008 | Tabata | A63F 13/12 463/41 |
| 2019/0197824 A1 * | 6/2019 | Timperley | G07F 17/3227 |

(Continued)

OTHER PUBLICATIONS

Chen et al., "Technology Advances in Flexible Displays and Substrates", IEEE Access, published May 10, 2013, vol. 1, pp. 150-158.

(Continued)

*Primary Examiner* — Adetokunbo O Torimiro

(74) *Attorney, Agent, or Firm* — Armstrong Teasdale LLP

(57) ABSTRACT

In one aspect, an electronic gaming system is described. The electronic gaming system includes a plurality of electronic gaming machines (EGMs), the plurality of EGMs spaced apart from a central axis by a distance and defining an interior portion therebetween. The electronic gaming system also includes a flexible display device extending from the interior portion to an overhead position above the plurality of EGMs, the flexible display device including a plurality of flexible display panels, each flexible display panel of the plurality of flexible display panels controlled by at least one EGM of the plurality of EGMs.

20 Claims, 16 Drawing Sheets

(56) References Cited

U.S. PATENT DOCUMENTS

2020/0081541 A1* 3/2020 Myung .................. G01L 1/183
2020/0090453 A1* 3/2020 Nelson .................... A63F 13/25

OTHER PUBLICATIONS

Gregory Mone, "The Future is Flexible Displays", Communications of the ACM, Jun. 2013, vol. 56, No. 6, pp. 16-17.
Featherstone et al., "Flexible Display Patent Landscape and Implications from the America Invents Act", Nanotechnology Law & Business 181, Fall 2014, pp. 181-194.
Jayswal et al., "Overview on Flexible Electronics Technology", Journal of Advanced Computing and Communication Technologies, ISSN: 2347-2804, vol. 5, Issue 3, Jun. 2017, pp. 61-66.
Gregory P. Crawford, "Flexible Flat Panel Display Technology", 2005 John Wiley & Sons, Ltd., pp. 1-9.
Alwin Poulose, "Flexible Display", Msc. Electronics, 26 pages.
Tom Geller, "The Promise of Flexible Displays", Communications of the ACM, Jun. 2011, vol. 54, No. 6, pp. 16-18.
Kris Carlon, "The only thing stopping flexible displays from taking over is that no one is making them", https://www.androidauthority.com/when-will-flexible-displays-arrive-688227/, Apr. 29, 2016, 10 pages.
Wikipedia, "Flexible display", https://en.wikipedia.org/wiki/Flexible_display, printed Oct. 20, 2020, 14 pages.

* cited by examiner

FLEXIBLE DISPLAY FOR USE WITH ONE OR MORE ELECTRONIC GAMING MACHINES

CROSS REFERENCE TO RELATED APPLICATIONS

The present application claims the benefit of and priority to U.S. Provisional Patent Application No. 62/878,145, filed Jul. 24, 2019, and entitled "FLEXIBLE DISPLAY FOR USE WITH ONE OR MORE ELECTRONIC GAMING MACHINES," and is related to U.S. patent application Ser. No. 29/701,668, filed Aug. 13, 2019, the disclosures of which are hereby incorporated by reference in their entireties.

TECHNICAL FIELD

The field of disclosure relates generally to electronic gaming, and more particularly, to a flexible display configured to be mounted in a variety of positions relative to one or more electronic gaming machines, such as over, above, or below the one or more electronic gaming machines, and where the flexible display may be networked with the one or more electronic gaming machines to display content provided, at least, by the electronic gaming machines.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix," which may define a plurality of symbol positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

SUMMARY

In one aspect, an electronic gaming system is described. The electronic gaming system includes a plurality of electronic gaming machines (EGMs), the plurality of EGMs spaced apart from a central axis by a distance and defining an interior portion therebetween. The electronic gaming system also includes a flexible display device extending from the interior portion to an overhead position above the plurality of EGMs, the flexible display device including a plurality of flexible display panels, each flexible display panel of the plurality of flexible display panels controlled by at least one EGM of the plurality of EGMs.

BRIEF DESCRIPTION OF THE DRAWINGS

An example embodiment of the subject matter disclosed will now be described with reference to the accompanying drawings.

DETAILED DESCRIPTION

A flexible display configured to be mounted over a bank of electronic gaming machines is provided. The flexible display may be assembled from a plurality flexible display panels, each of which may include a plurality of light emitting diodes mounted on a flexible printed circuit board. The flexible display may be shaped as desired, and once assembled, each flexible display panel may be controlled by a respective electronic gaming machine, a server system, and/or in any other suitable manner, to display animated (or static) content, which may be game or casino related, on the flexible display.

Figure 1:
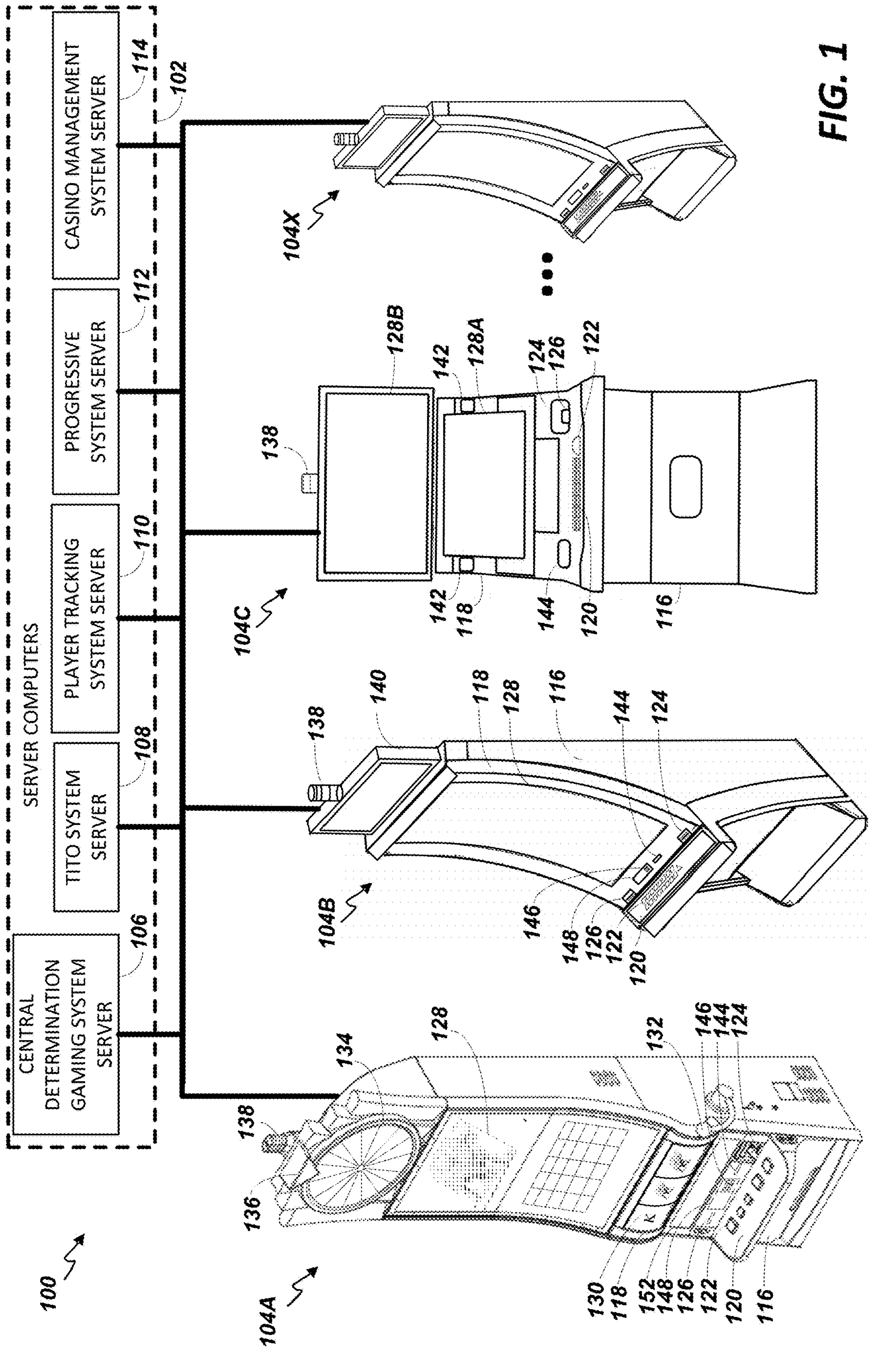
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
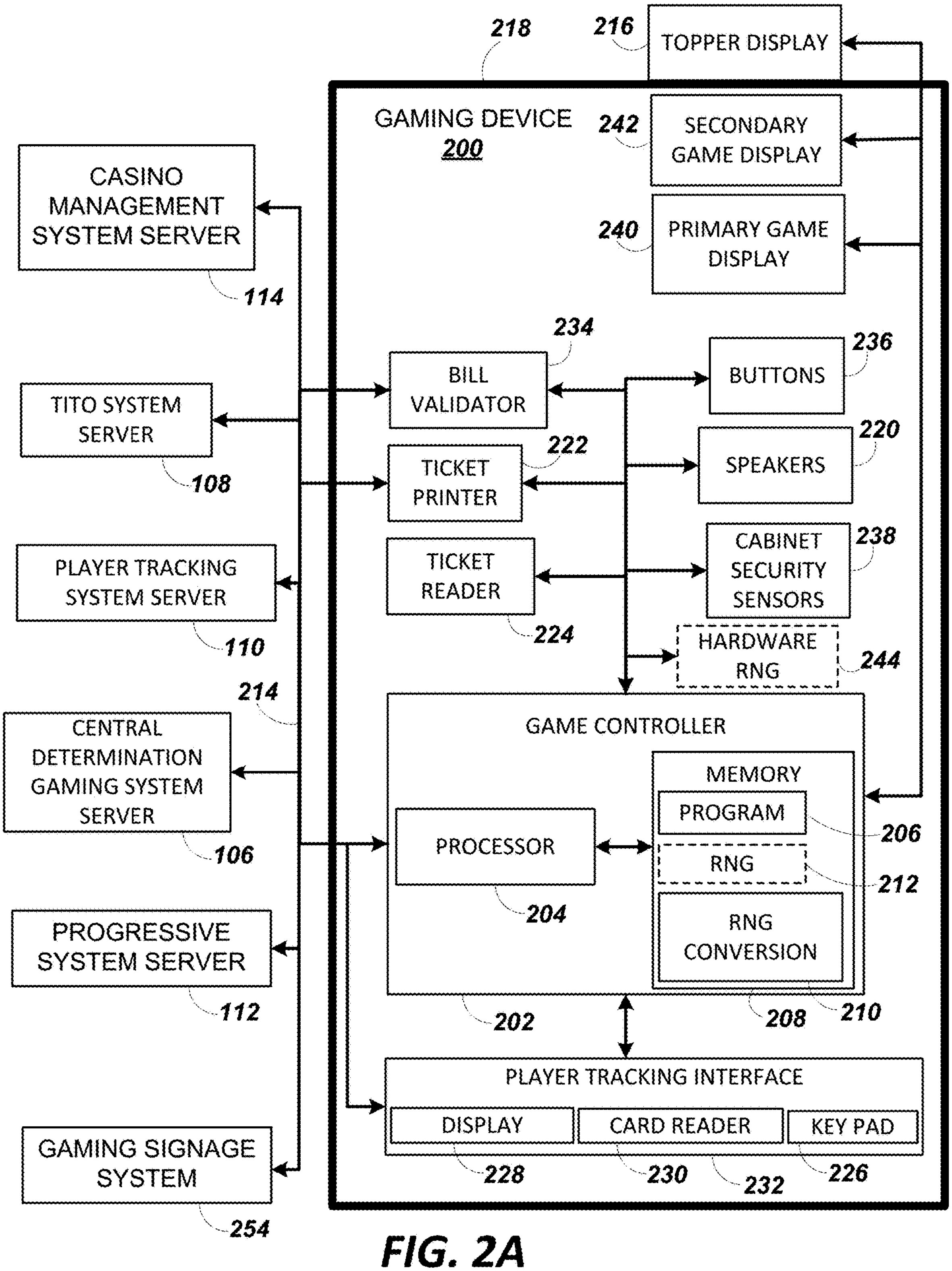
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
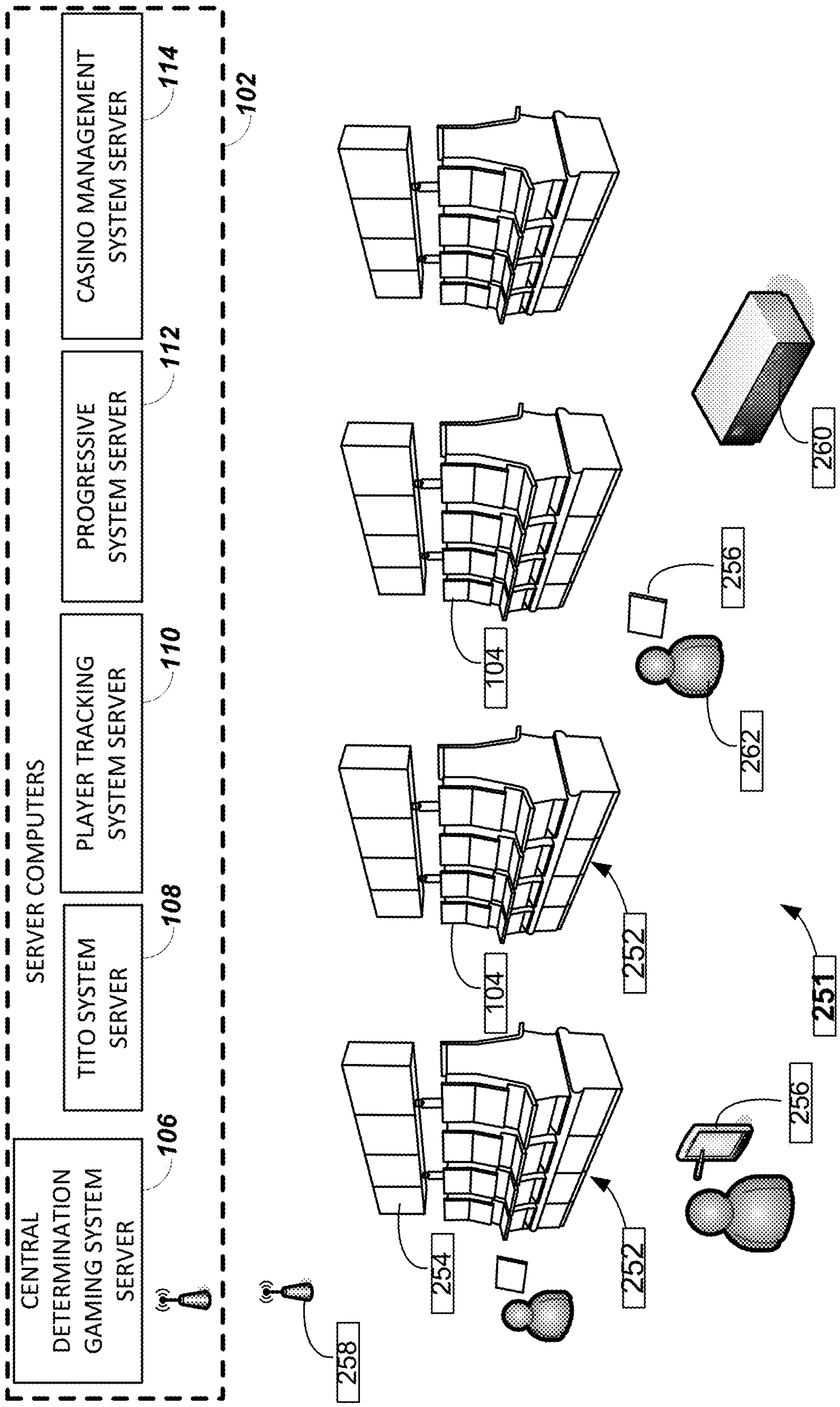
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
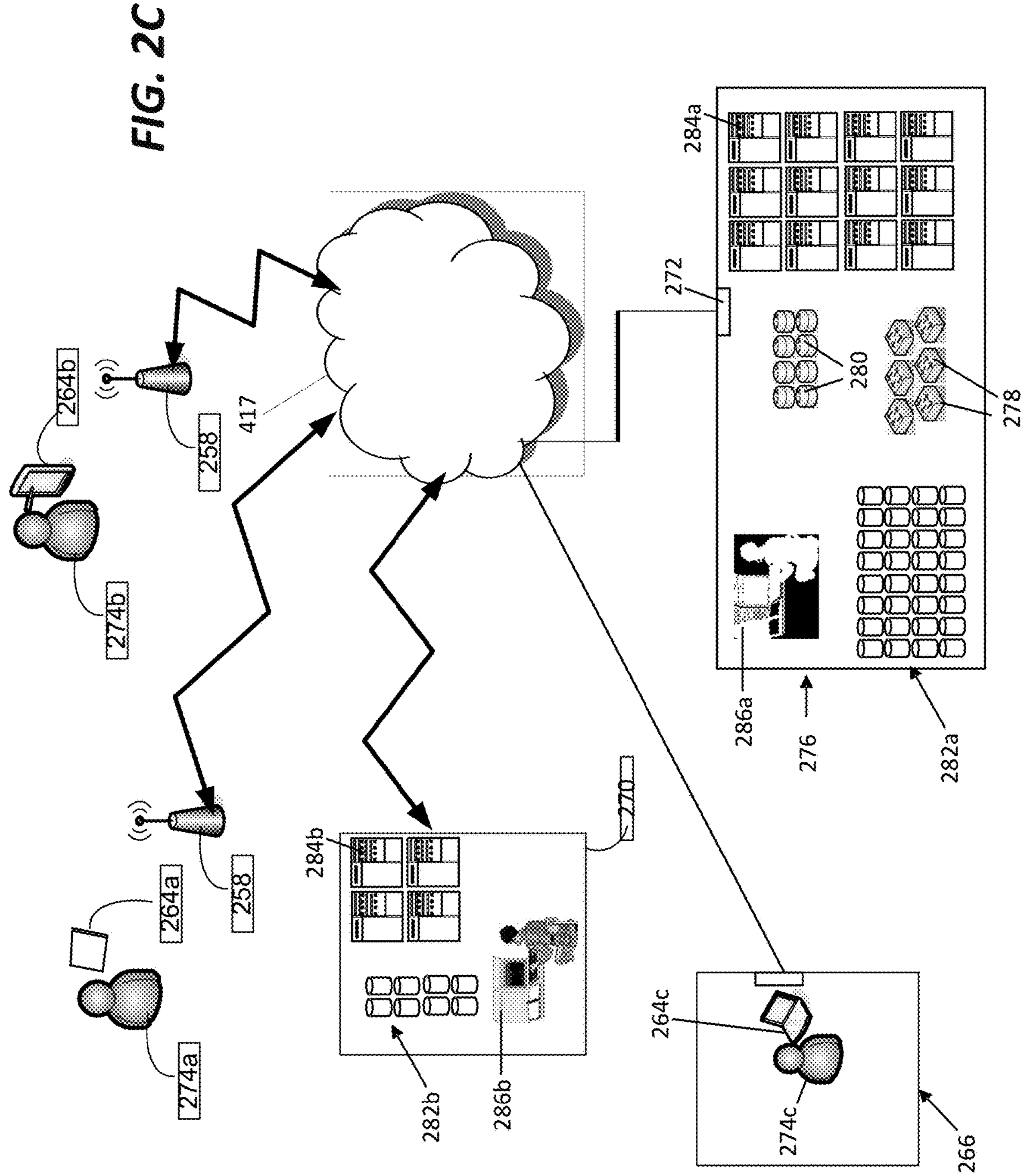
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
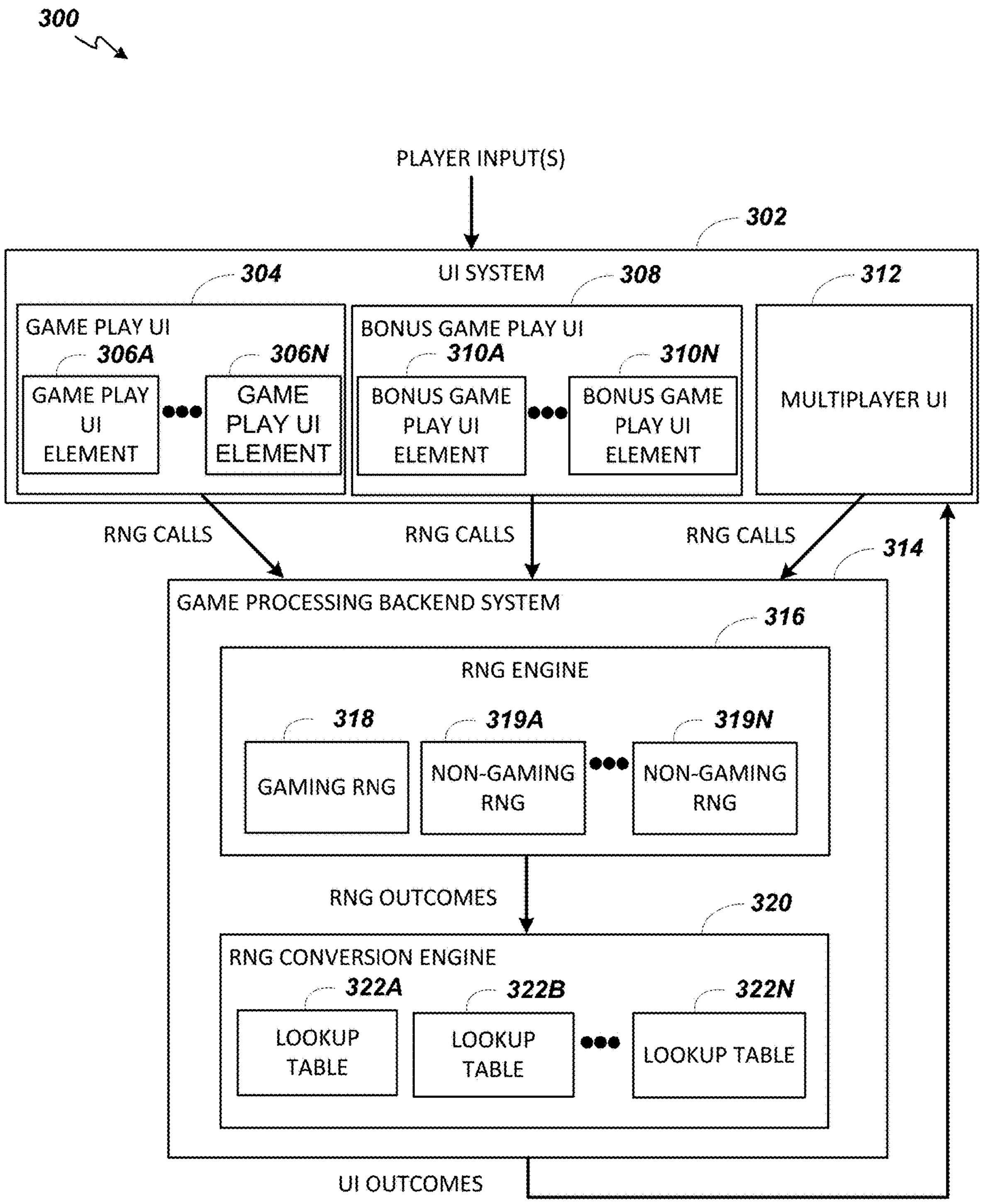
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements

310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
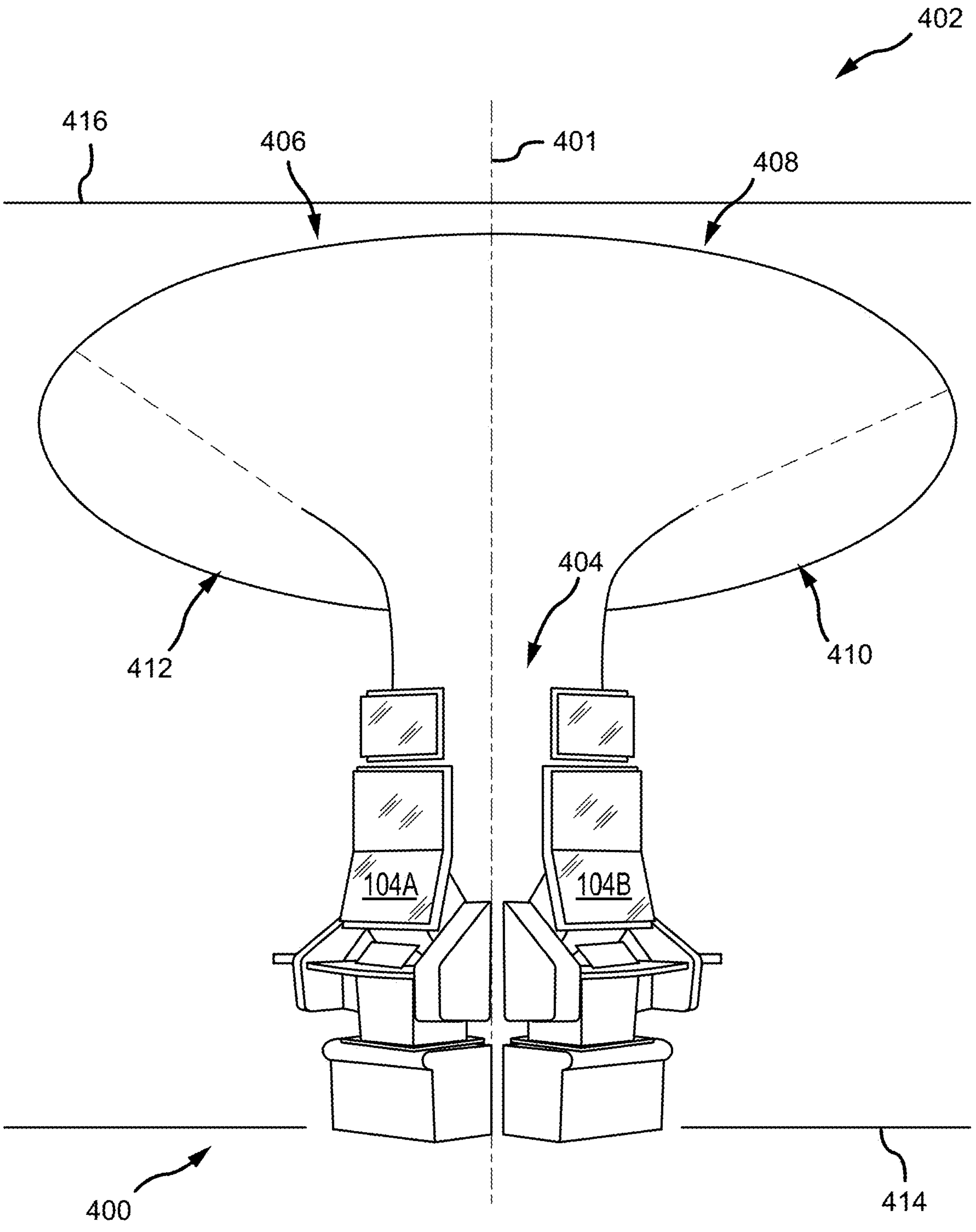
FIG. 4 is a perspective view of a first example flexible display mounted over a bank of electronic gaming machines.

FIG. 4 is a perspective view of an example bank of electronic gaming machines (EGMs) 400. In the example embodiment, bank of EGMs 400 includes a flexible display device 402, which may be mounted in a variety of positions relative to bank of EGMs 400. For example, in at least some embodiments, flexible display 402 may be mounted at least partially over or above bank of EGMs 400. Although flexible display 402 is primarily described herein as being mounted over or above bank of EGMs 400, in some embodiments, flexible display 402 may be mounted over a single EGM 104A-104D (or "kiosk") and/or over any other casino gaming device, such as an ATM machine within a casino, a digital display or digital signage within a casino, and the like.

In at least one embodiment, bank of EGMs 400 includes a plurality of EGMs 104A-104X arranged in a ring or circular shape about a central axis 401 and oriented such that a gaming display area 118 of each EGM 104A-104X faces outward from a central or interior portion 404 of the bank of EGMs 400. Each EGM 104A-104X may also be spaced concentrically apart from an adjacent EGM 104A-104X positioned to either side thereof. In the illustrated embodiment, EGM lounge 400 includes four EGMs 104A-104D. However, it will be appreciated that any suitable number of EGMs 104A-104X may be included in EGM lounge 400.

EGMs 104A-104D may be positioned at approximately ninety degree intervals, such that a gaming display area 118 of a first EGM 104A is positioned diametrically opposite a gaming display area 118 of a second EGM 104C (not shown). Similarly, a gaming display area 118 of a third EGM 104B may be positioned diametrically opposite a gaming display area 118 of a fourth EGM 104D. Thus, a player seated or standing to play a game on any of EGMs 104A-104D may be positioned relative to his or her EGM 104A-104D in a manner that facilitates viewing of flexible display 402, as described in greater detail herein. In other words, EGMs 104A-104D are positioned at ninety degree intervals to facilitate viewing of flexible display 402, which may extend from interior portion 404 of bank of EGMs 400 to a position over or above EGMs 104A-104D.

As described herein, EGMs 104A-104D within EGM lounge 400 may include an independent game controller 202 (that includes one or more processors 204) and a memory 208 coupled to the processor 204 that stores one or more games or game programs 206. EGMs 104A-104D may also be networked and capable of communicating with one another, such as, for example, through a server system, to facilitate gameplay. For example, in at least one embodiment, EGMs 104A-104D are networked through any of servers 106-114. Likewise, in at least some embodiments, EGMs 104A-104D are networked, as described, to accommodate a tournament game, which may be joined and played using any of EGMs 104A-104D. In simpler terms, bank of EGMs 400 may be configured to facilitate a tournament game, where players participate in the tournament game from any of the EGMs 104A-104D.

In the example embodiment, flexible display 402 includes a plurality of flexible display panels, such as a first flexible display panel 406, a second flexible display panel 408, a third flexible display panel 410, and a fourth flexible display panel 412. As shown, in at least one embodiment, flexible display panels 406-412 may extend substantially from a surface location 414 within interior portion 404 of bank of EGMs 400 to a location substantially above or over bank of EGMs 400, such as, for instance, to a ceiling surface 416. In addition, flexible display panels 406-412 may arranged in ninety degree segments in a one-to-one correspondence with a respective EGM 104A-104D, such that each flexible display panel 406-412 is associated with and physically arranged relative to a respective EGM 104A-104D.

Further, as described in additional detail herein, flexible display panels 406-412 may be flexibly manipulated or arranged during installation to create a desired shape for flexible display 402. For example, in at least some embodiments, flexible display panels 406-412 may form ninety degree sections of a funnel shaped flexible display 402. In some embodiments, for example, flexible display panels 406-412 are configured to be manipulated such that they may each bend up to three hundred sixty degrees (e.g., creating a cylindrical shape). Other shapes are also contemplated. For example, a variety of cylindrical, tubular, polyhedral, and other shapes are within the scope of the present disclosure. Accordingly, because of the flexibility of flexible display panels 406-412, flexible display panels 406-412 may be coupled to already existing structures (e.g., pillars on a casino floor), and do not require additional structures to be built. Thus, flexible display 402 including flexible display panels 406-412 may be easily installed in any existing environment. In some embodiments, flexible display 402 includes enough structure that it does not need to be coupled to, as an example, a pillar on a casino floor. Rather, flexible display 402 may be coupled to at least one EGM 104A-104D and extend upward without being coupled to a structure providing additional support.

A funnel shape is described herein primarily for the purpose of illustration. For example, the funnel shape includes flexible display 402 extending from surface location 414 to ceiling surface 416 wherein flexible display 402 includes a relatively small circumference at surface location 414 and a relatively larger circumference at ceiling surface 416, thus creating a funnel shape. Accordingly, flexible display 402 covers a larger surface area at/near ceiling surface 416 than at surface location 414. In some embodiments, flexible display panels 406-412 of flexible display 402 may include different screen resolutions depending on a relative vertical location of flexible display panels 406-412 or portion thereof. For example, portions of flexible display panels 406-412 closer to surface location 414 may include a higher resolution than portions of flexible display panels 406-412 closer to ceiling surface 416. In some embodiments, portions of flexible display panels 406-412 closer to surface location 414 may include a lower resolution than portions of flexible display panels 406-412 closer to ceiling surface 416 (e.g., panel resolution depends on a vertical location of flexible display panels 406-412 and portions thereof). For example, portions of flexible display panels 406-412 closer to ceiling surface 416 may be configured to have a relatively higher resolution because these portions of flexible display panels 406-412 are farther away from players and need to include a higher resolution to be seen accurately by players. However, in some embodiments, as flexible display panels 406-412 extend upward and outward, as is shown in the example of a funnel shape, flexible display panels 406-412 may lose resolution as they expand outward and cover a larger surface area.

In addition, although four flexible display panels 406-412 are described, it will be appreciated that flexible display 402 may be divided into any suitable number of flexible display panels, including a single flexible display panel. For example, in at least some embodiments, a bank of four EGMs 104A-104D may include two flexible display panels per EGM 104A-104D for a total of eight flexible display panels. More generally, any suitable number of flexible display panels may be implemented to achieve a desired shape and/or functionality of flexible display 402.

Each flexible display panel 406-412 may include a plurality of light emitting diodes (LEDs), such as, for example, a plurality of LEDs arranged in a matrix of LEDs. In various embodiments, the LEDs of each display panel 406-412 may include color LEDs (e.g., tri-color LEDs) and/or any other suitable LED. The matrix of LEDs may, in addition, be manufactured on a flexible substrate, such as a flexible printed circuit board (PCB). In some embodiments, a flexible housing (e.g., a rubber and/or another flexible plastic or synthetic material) may surround or house the LEDs and/or PCB to create a flexible display panel 406-412 (e.g., a thin display screen is printed onto a flexible material). In addition, in at least some embodiments, each flexible display panel 406-412 may include a plurality of sub-panels, each of which may include an LED matrix, and each of which may be electrically and/or mechanically coupled to create a larger flexible display panel 406-412.

However, it should be noted that flexible display panels 406-412 may include any flexible display panel such as, as examples, flexible LCDs, flexible organic/inorganic light emitting devices (FOLEDs, e.g., including thin film transistor (TFT) technology), flexible active matrix organic light-emitting diode (AMOLED) displays, electronic paper (e-paper), electrowetting displays (EWD), and electrochromic displays. Advantages of flexible displays, as opposed to displays that are not flexible, include that flexible displays are light weight, space saving, foldable, bendable, include increased circuit density, and provide for a wider viewing angle than a flat display. In some embodiments, flexible display panels 406-412 may include a water-resistant layer and/or a buffer layer (e.g., to offset stress from bending the display), and include any variety of inorganic (e.g., indium tin oxide (ITO)) and organic (e.g., conducting polymers) layers and components.

In the example embodiment, each flexible display panel 406-412 may also include a display controller (e.g., including at least a processor and a memory) configured to control graphics or video displayed on the flexible display panel 406-412. In other embodiments, only one flexible display panel 406-412 includes a display controller. In such an embodiment, the display controller may control graphics or video display on each of the flexible display panel 406-412. To this end, in at least some embodiments, each flexible display panel 406-412 is also configured to be electrically or communicatively coupled to at least one other flexible display panel 406-412 (e.g., via one or more electrical connectors, such as one or more display connectors) of flexible display 402.

In some embodiments, each flexible display panel 406-412 of flexible display 402 includes vibration components such that, for example, each flexible display panel 406-412 may vibrate upon activation of the vibration components (e.g., in response to receiving a vibrate signal generated in response to a bonus/jackpot being presented at an EGM 104A-104X). Further, each flexible display panel 406-412 may include sensor components (e.g., including at least one infrared sensor) and/or touchscreen components to, as an example, detect patrons/objects in contact with and/or near flexible display 402. For example, when at least one patron is detected nearby (e.g., by the infrared sensor), flexible display 402 may transition to being in an "attract mode" as described herein (e.g., to attract nearby patrons to play games at an EGM 104A-104X). In some embodiments, where flexible display 402 extends outward on floor surface 414 (e.g., as shown in FIG. 10), the touchscreen components of flexible display 402 may detect the presence of a patron standing on flexible display 402 and cause flexible display 402 to enter the attract mode, or any other mode. As another example, the touchscreen components of flexible display 402 may be used at least in part for play of a game at an EGM 104A-104X (e.g., during play of a skill-based dancing game).

Likewise, in at least some embodiments, one or more flexible display panels 406-412 may include a data input port (e.g., a USB port) configured to receive a memory device (e.g., flash memory, such as a thumb-drive). The flash memory may include content for display on one or more flexible display panels 406-412, and a processor or controller of one or more flexible display panel 406-412 may read the flash memory to retrieve, process, and/or display the content stored thereon.

Likewise, in at least some embodiments, each flexible display panel 406-412 may be electrically or communicatively coupled to one or more EGMs 104A-104D (e.g., game controllers 202 of each EGM 104A-104D). For example, each flexible display panel 406-412 may be communicatively coupled to one or more EGMs 104A-104D of bank of EGMs 400. In such an embodiment, each EGM 14A-104D may directly control content displayed on any of flexible display panel 406-412. For example, an EGM 104A-104D may include a media controller, which may function to provide content to one or more flexible display panel 406-412. Similarly, as described elsewhere herein, in at least some embodiments, content may be provided to flexible display 402 from one or more server systems, such as one or more third party servers and/or one or more casino servers (e.g., servers 106-114). In addition, in at least some embodiments, flexible display panels 406-412 may be controlled by an edge lighting controller.

To assemble flexible display 402, each flexible display panel 406-412 is electrically and/or mechanically coupled to an adjacent flexible display panel 406-412 to create flexible display 402 in its assembled shape (e.g., in a funnel shape and/or in any other suitable shape). Specifically, each flexible display panel 406-412 may include one or more engagement surfaces, which may mechanically engage with the engagement surfaces of adjacent flexible display panels 406-412. As described herein, adjacent flexible display panel 406-412 may also be electrically and/or communicatively coupled.

Flexible display 402 may also be internally supported by one or more support members, such as, for example, one or more rigid support members and/or one or more wires or cables capable of suspending or supporting a flexible display panel 406-412. For example, in at least one embodiment, an internal lattice of support members may be arranged within an interior portion of flexible display 402 (e.g., within the funnel if flexible display 402 is funnel shaped) to support flexible display above bank of EGMs 400. Similarly, in at least one embodiment, each flexible display panel 406-412 may be mechanically coupled to floor surface 414, ceiling surface 416, and/or one or more EGMs 104A-104D.

In operation, content may be displayed on flexible display 402 in a variety of ways. For instance, in one embodiment, a controller, such as a game controller 202 of an EGM 104A-104D within bank of EGMs 400 and/or a display controller of any flexible display panel 406-412, controls flexible display 402 to display content on one or more of flexible display panel 406-412.

As described herein, any EGM 104A-104D of bank of EGMS 400 may communicate with and control any flexible display panel 406-412. In addition, any EGM 104A-104D may control what is displayed on the entire flexible display 402, such as by controlling each flexible display panel 406-412 independently and/or by providing a control instruction to a display controller of one flexible display panel 406-412, which may communicate the control instruction to other flexible display panels 406-412. Likewise, in at least some embodiments, one or more display controllers of flexible display 402 may communicate with a server system 106-114 to receive and display content.

Thus, content may be displayed on each flexible display panel 406-412. The content may, in at least some embodiments, relate to a game being played on at least one EGM 104A-104D. For example, EGM 104A may implement a first game, EGM 104B may implement a second game, EGM 104C may implement a third game, and EGM 104D may implement a fourth game. In this case, content displayed on flexible display panel 406 may relate to any of the first, second, third, or fourth games. For example, content displayed on any flexible display panel 406-412 may indicate a game outcome (or outcomes, such as an award or jackpot) provided in any of the four games. Moreover, content related to a game played on EGM 104A may be displayed on the flexible display panel 406 associated with EGM 104A, and so on for the remainder of EGMs 104B-104D. In some embodiments, content related to a common game played on each of EGMs 104A-104D may be displayed on flexible display (e.g., a race is displayed on flexible display 402 and the outcome of a game played at EGMs 104A-104D is determined at least in part on the outcome of the displayed race). In some embodiments, a particular EGM 104A-104D may control a portion of flexible display 402 (e.g., flexible display panels 406-412) positioned directly and/or substantially above the particular EGM 104A-104D.

During play of a base game, a base game animation may be displayed on flexible display 402 (e.g., coins circling, bills circling, a volcano filling with coins/lava, etc.). In some embodiments, the base game animation may be displayed on flexible display 402 as traveling from a flexible display panel 406-412 to another flexible display panel 406-412 (e.g., base game animation travels laterally around a circumference of flexible display 402).

In some embodiments, upon a bonus game being triggered on at least one EGM 104A-104D, a bonus game animation may be displayed on at least a portion of flexible display 402 positioned above the EGM 104A-104D where the bonus game was awarded. In some embodiments, upon a bonus, such as a jackpot, being presented at at least one EGM 104A-104D, a bonus animation is displayed on at least a portion of flexible display 402. For example, the bonus animation may include more detail/objects displayed than the base game animation, to further communicate to players that a bonus has been awarded at at least one EGM 104A-104D. In some embodiments, the bonus animation may be displayed directly/substantially above (e.g., proximate to) the EGM 104A-104D where the bonus was presented to a player thereof. In some embodiments, the bonus animation may be displayed proximate to the EGM 104A-104D where the bonus was presented, and remain proximate to the EGM 104A-104D for a predefined period of time and/or until a bonus is presented at a different EGM 104A-104D. For example, when a bonus is presented at a different EGM 104A-104D, the bonus animation may travel across flexible display 402 until the bonus animation is proximate to the different EGM 104A-104D where a bonus was most recently presented.

In some embodiments, a camera may be communicatively coupled to flexible display 402 and/or another device communicatively coupled to flexible display 402 (e.g., EGMs 104A-104D, any of servers 106-114, etc.). In these embodiments, the camera may be configured to record players playing at EGMs 104A-104D. In some embodiments, a player at any of EGMs 104A-104D will only be recorded by the camera upon granting permission to be recorded. The camera is configured to, as an example, record player reactions upon a bonus being presented at any of EGMs 104A-104D. For example, in response to a bonus being presented at an EGM 104A-104D, the camera is controlled by at least one of EGMs 104A-104D and/or servers 106-114 to generate digital content (e.g., record a video of the player) at the EGM 104A-104D where the bonus is presented to capture the player reaction. In some embodiments, the camera stores the digital content in a memory as described herein. In some embodiments, the digital content is transmitted to flexible display 402, and in response to receiving the digital content, flexible display 402 displays the digital content generated by the camera in response to receiving the digital content to show the player reaction to the player and/or other patrons. In some embodiments, the digital content, including at least one player reaction, is displayed on flexible display 402 when flexible display 402 is operating in an attract mode as described herein.

In some embodiments, content may also include a tournament animation (e.g., a tournament leaderboard) based on a tournament game played on EGMs 104A-104D. In embodiments where the game is a tournament game, each flexible display panel 406-412 may display a virtual leaderboard including relative positions of players in a tournament associated with the tournament game. For example, each flexible display panel 406-412 may display a relative tournament position of a player (e.g., on a leaderboard) playing at an EGM 104A-104D positioned under (or substantially under) the respective flexible display panel 406-412.

In addition, content/animations may be controlled, as described herein, in a manner that causes the content to appear to move between an EGM 104A-104D and flexible display panels 406-412. For example, when an award (e.g., a jackpot) is provided on an EGM 104A-104D, the content may also be controlled to move or "fly up" to one or more flexible display panel 406-412. As a result, other players of bank of EGMs 400 may see an indication on flexible display 402 that another player has achieved an award (thereby adding to player excitement).

Content may also appear to "fly down" (e.g., in the form of a lightning strike or another "fly down" animation) from one or more flexible display panels 406-412 to one or more EGMs 104A-104D. For example, in at least one embodiment, when a player achieves a certain type of game event (e.g., an award, such as a jackpot), content related to the game event may fly up from the player's EGM 104A-104D to flexible display panel 406-412 and/or fly down (e.g., as a lightning strike or another fly down animation) to the gaming display areas 118 of one or more other EGMs 104A-104D.

Content may therefore move or flow between EGMs 104A-104D and flexible display panels 406-412 in a variety of patterns and using a variety of animations, where a lighting strike effect is only one of many possible such animated effects. Content may also be distributed to flow or transition between flexible display panels 406-412, such as, for example, to create a variety of motion effects or graphical effects in which an animation appears to move (e.g., in a rotation) around flexible display 402, and the like.

In some embodiments, different animations may be displayed on particular portions of flexible display 402 based on information associated with a player at an EGM 104A-104X. For example, a portion of flexible display 402 above a player who is a member of a rewards club may display a more detailed animation than a portion of flexible display 402 above a player who is not a member of the rewards club. As another example, a portion of flexible display 402 above a player included in a higher tier of the rewards club may display a more detailed animation than a portion of flexible display 402 above a player included in a lower tier level of the rewards club. In some embodiments, flexible display 402 is configured to display advertisements. In these embodiments, flexible display 402 may be configured to only display advertisements proximate to players who are not members of a rewards club.

Several different animations or display effects are described below with reference to FIGS. 5A-10B. It will be appreciated that the animations described herein are only illustrative and that many other similar possibilities exist and are contemplated by and within the scope of the present disclosure.

Figure 5A:
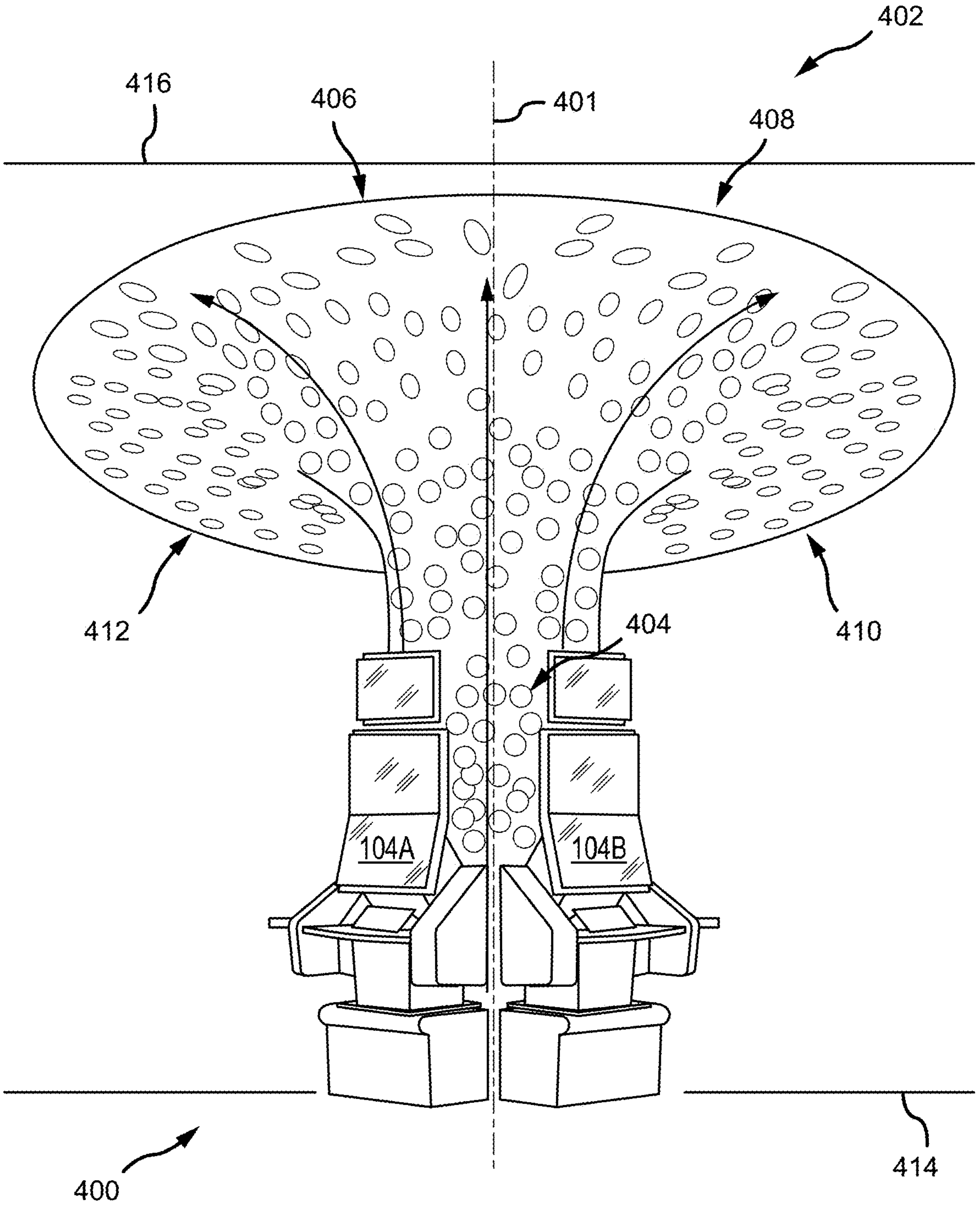
FIG. 5A is a perspective view of the first example flexible display shown in FIG. 1, in which an animated coin fountain is displayed on the flexible display.
Figure 5B:
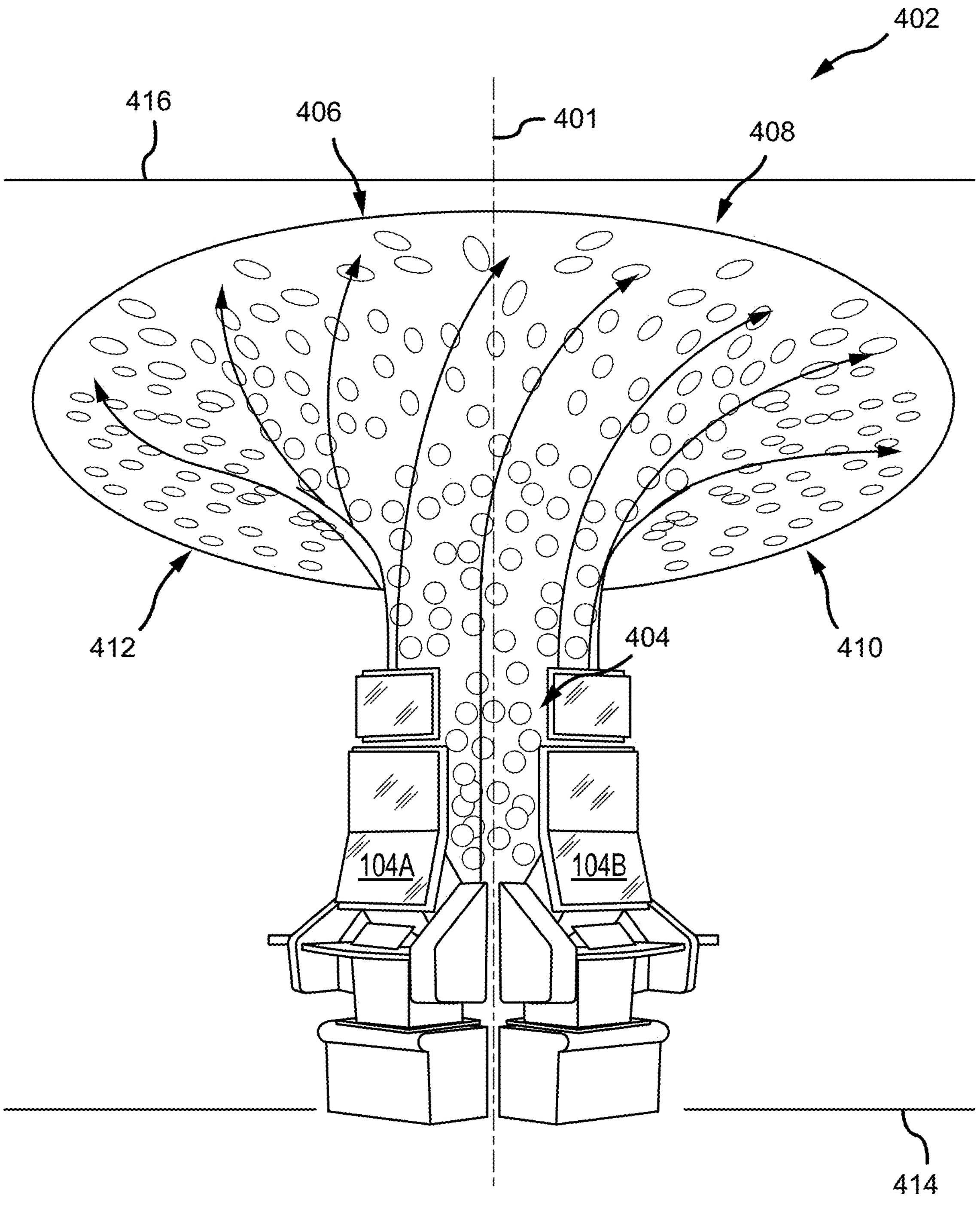
FIG. 5B is a perspective view the first example flexible display shown in FIG. 1, in which an animated cyclone fountain is displayed on the flexible display.

Accordingly, FIG. 5A is a perspective view of flexible display 402, in which an animated coin fountain is displayed. As shown, the coin fountain may span one or more of flexible display panels 406-412 and may generally depict a bubbling fountain of coins, which may appear to move from a lower portion of flexible display 402 near floor surface 414 towards an upper portion of flexible display 402 near ceiling surface 416. In various embodiments, the coin fountain may be displayed in response to a variety of conditions or triggering events occurring on EGMs 104A-104D, such as, for example, in response to a winning game outcome or progressive jackpot award. Likewise, the coin fountain may be more passively displayed, such as during an attract mode (e.g., not in response to a winning game outcome or progressive jackpot but to attract players to bank of EGMs 400). In some embodiments, during attract mode, flexible display 402 is configured to display FIG. 5B is a perspective view flexible display 402, in which an animated cyclone fountain (similar to the coin fountain shown at FIG. 5A) is displayed. In this embodiment, the coin fountain shown and described with reference to FIG. 5A may be displayed on flexible display 402, and a rotation of the coins within the fountain about a center axis of flexible display 402 (or around flexible display 402, such as from right to left or left to right) may be added, such that the coins simultaneously appear to bubble up from floor surface 414 as well as flow around flexible display 402. As a result, the coin fountain may swirl or rotate as a "cyclone" fountain.

Figure 6:
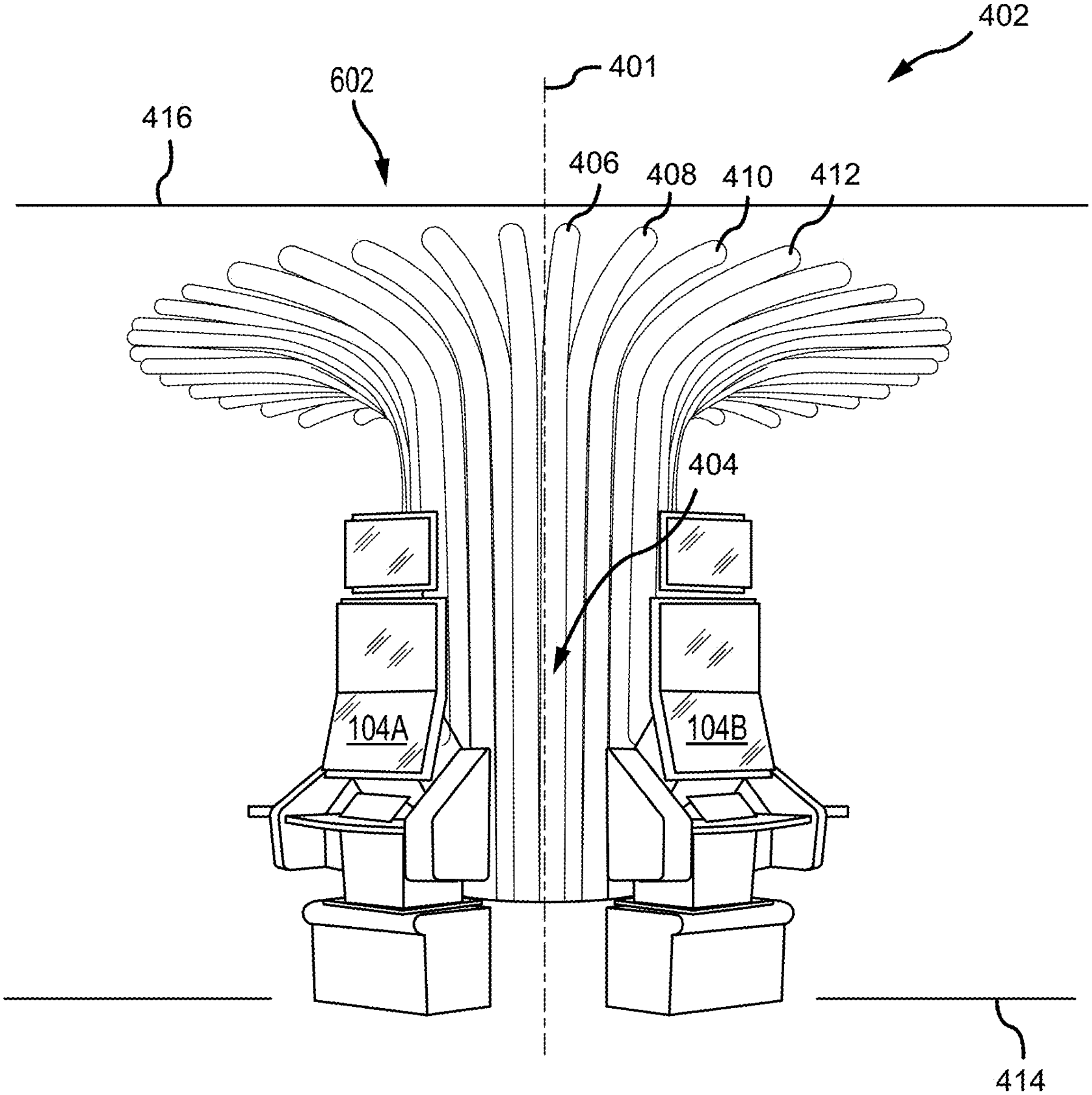
FIG. 6 is a perspective view of the first example flexible display shown in FIG. 1, in which a first patterned graphic is displayed on the flexible display.

FIG. 6 is a perspective view of flexible display 402, in which a first patterned graphic 602 is displayed. In this embodiment, a patterned graphic 602, such as a plurality of vertically oriented stripes may be displayed on flexible display 402. In addition, each vertical stripe of patterned graphic 602 may be displayed on a particular flexible display panel 406-412, which may be narrower or wider to accommodate a stripe width. In addition, as shown, a larger (or smaller) number of flexible display panels 406-412 may be included in flexible display 402, depending, for example, upon a number of vertical stripes. Further, as described in greater detail herein, the stripes may appear to move from left to right across one or more flexible display panels 406-412 and/or vertically, such as in a vertically pulsing or wave-like manner. In other embodiments, although vertical stripes are shown, horizontal and/or diagonally appearing stripes may be provided as well. Likewise, other patterns are contemplated and within the scope of the present disclosure.

Figure 7:
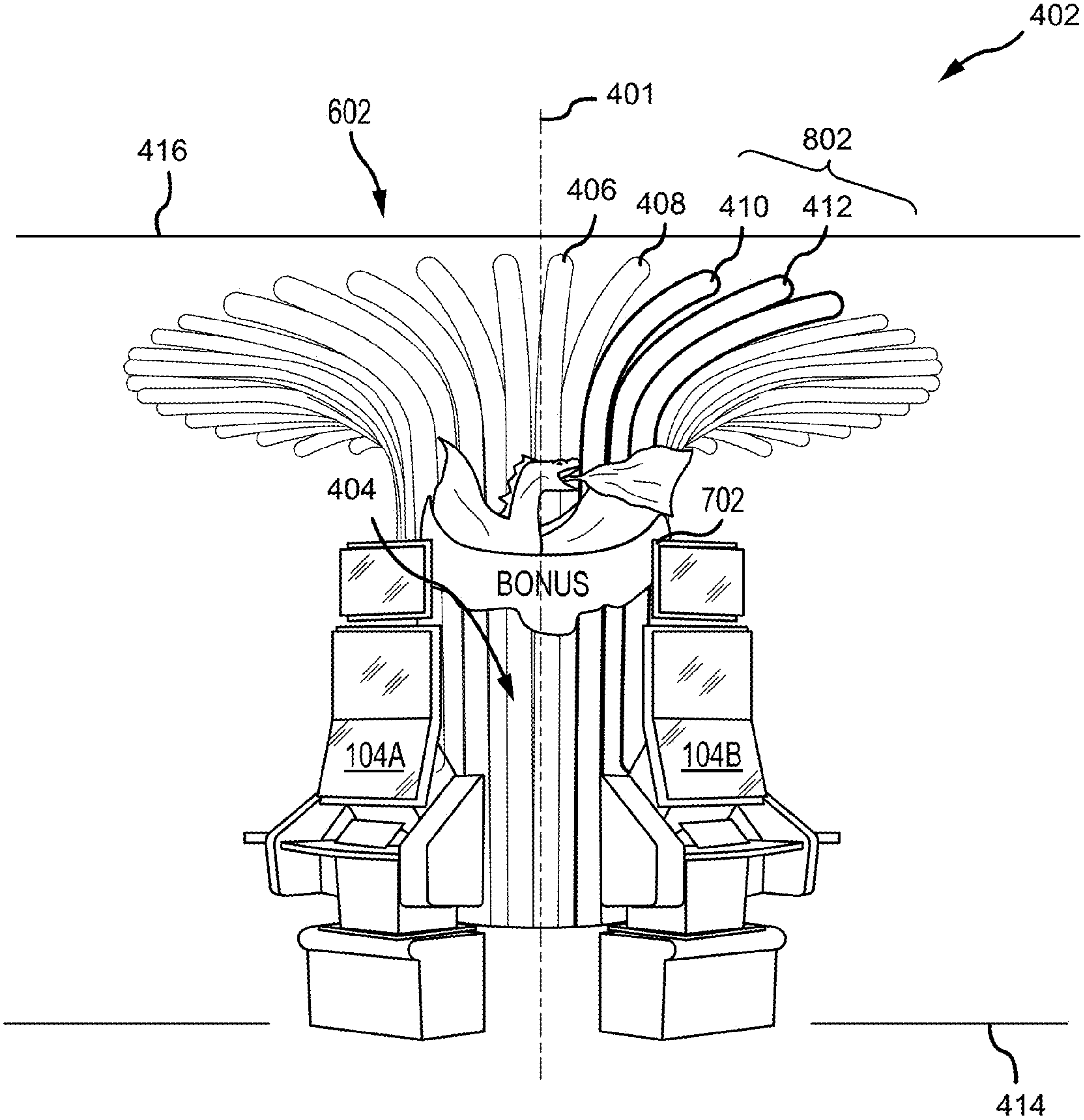
FIG. 7 is a perspective view of the first example flexible display shown in FIG. 1, in which the first patterned graphic shown in FIG. 6 rotates.
Figure 8:
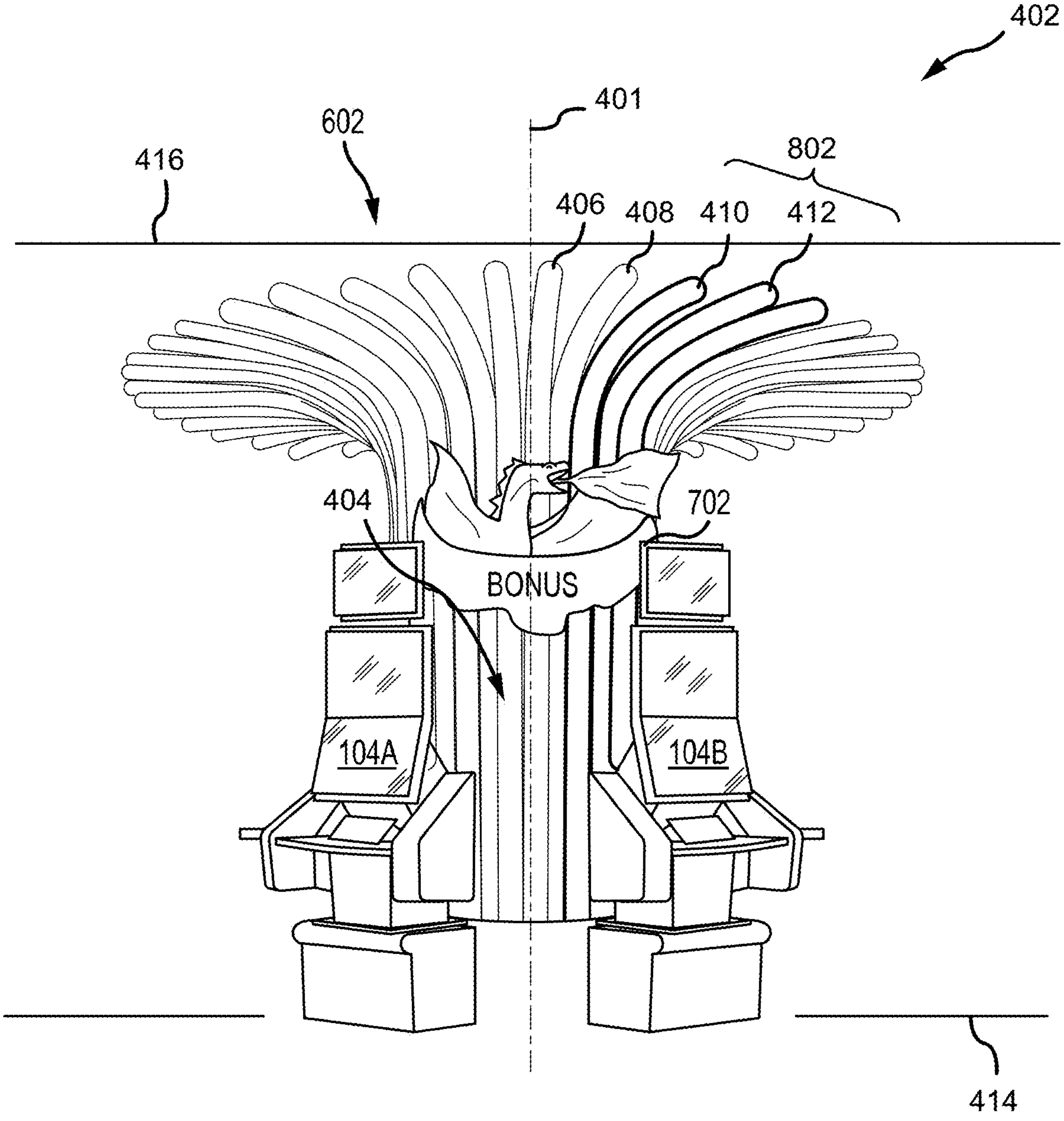
FIG. 8 is a perspective view of the first example flexible display shown in FIG. 1, in which the first patterned graphic shown in FIG. 6 identifies a winning electronic gaming machine from the bank of electronic gaming machines.

FIG. 7 is a perspective view of flexible display 402, in which the first patterned graphic 602 shown in FIG. 6 rotates. Specifically, the vertically oriented lines of first patterned graphic 602 may travel laterally around a circumference of flexible display 402, across and between flexible display panels 406-412. In some embodiments, the lines of patterned graphic 602 may travel from left-to-right, while in other embodiments, the lines may travel from right-to-left and/or alternatingly in both directions. Further, as shown, a second graphic 702 (in this case, a dragon) may be displayed across one or more display panels 406-412. Specifically, the second graphic 702 may be initially displayed on an EGM 104A-104X and transferred (e.g., using a visual transition effect) to flexible display 402.

As the lines of patterned graphic 602 rotate laterally around the circumference of flexible display 402, one or more lines (e.g., a group of lines, such as group of lines 802) may stop over and/or on physical relation to an EGM 104A-104D to identify the EGM 104A-104D. For instance, as shown with reference to FIG. 8, a group of three lines 802 of first patterned graphic 602 may stop over and in relation to EGM 104B to identify EGM 104B. In some embodiments, group of lines 802 may also change color (e.g., from pink to blue) to identify an EGM 104A-104D (e.g., a blue animation may be the bonus animation as described herein). Other graphics may also be added, such as flashing, pulsating, traveling, and/or any other suitable animation or graphic.

EGM 104B (or any other EGM 104A-104D) may be identified for any of a variety of reasons. For example in the embodiment shown in FIG. 8, group of lines 802 may stop over EGM 104B to indicate that a player of EGM 104B has been awarded a winning game outcome or game award. In another embodiment, group of lines 802 may stop over an EGM 104A-104D to indicate that it is a player's turn to place a wager or take a turn, such as, for example, in a turn-based wagering game. It will be appreciated, in addition, that flexible display 402 may identify an EGM 104A-104D for a variety of other reasons as well.

Figure 9:
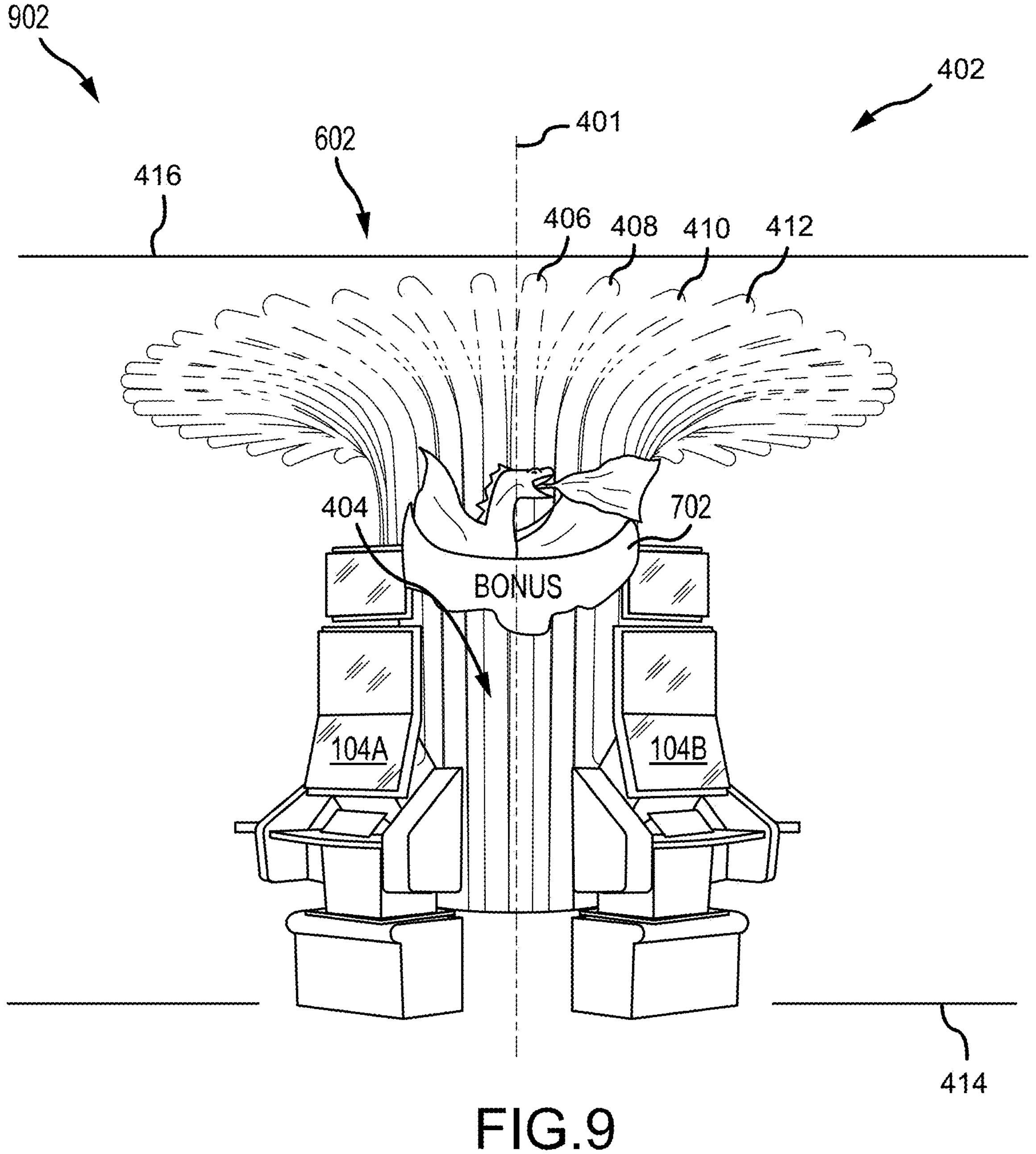
FIG. 9 is a perspective view of the first example flexible display shown in FIG. 1, in which a second patterned graphic is displayed on the flexible display.

FIG. 9 is a perspective view of flexible display 402, in which another patterned graphic 902 is displayed. As described above, flexible display panels 406-412 include a plurality of LEDs and are capable of displaying a variety of lighting patterns. Patterned graphic 902 is therefore another example of how flexible display panels 406-412 may be implemented. In this embodiment, each flexible display panel 406-412 displays a plurality of lines, as described above, except that each line is alternatingly light and dark (e.g., some portions of each flexible display panel 406-412 are turned off or "dark," while other portions are turned on or "light." This alternating light and dark arrangement gives rise to a concentric series of dark rings interspersed over an upper portion of flexible display 402. Flexible display panels 406-412 may be controlled to cause the LEDs of each flexible display panel 406-412 to turn on and off in a way that causes the concentric dark rings to move from an inner circumference towards an outer circumference, such as in a rolling or wave-like motion.

Other similar display graphics are also contemplated and within the scope of the present disclosure. For example, in at least one embodiment, flexible display panels (e.g., panels 406-412 and/or a greater number of panels) may be coupled and arranged to simulate a three-dimensional (3-D) display, such as from at least one vantage point. In other words, flexible display panels may be arranged to create an impression, from a designated perspective, of a 3-D animated image or graphic.

In addition to the several animations or display effects are described above, a shape of flexible display 402 may also be manipulated or adjusted. For example, in the embodiments described above, flexible display 402 is generally funnel-shaped. However, other shapes, such as cylinder shapes, rectangular shapes, triangular shapes, oval shapes, and the like are also contemplated and within the scope of the present disclosure.

Figure 10A:
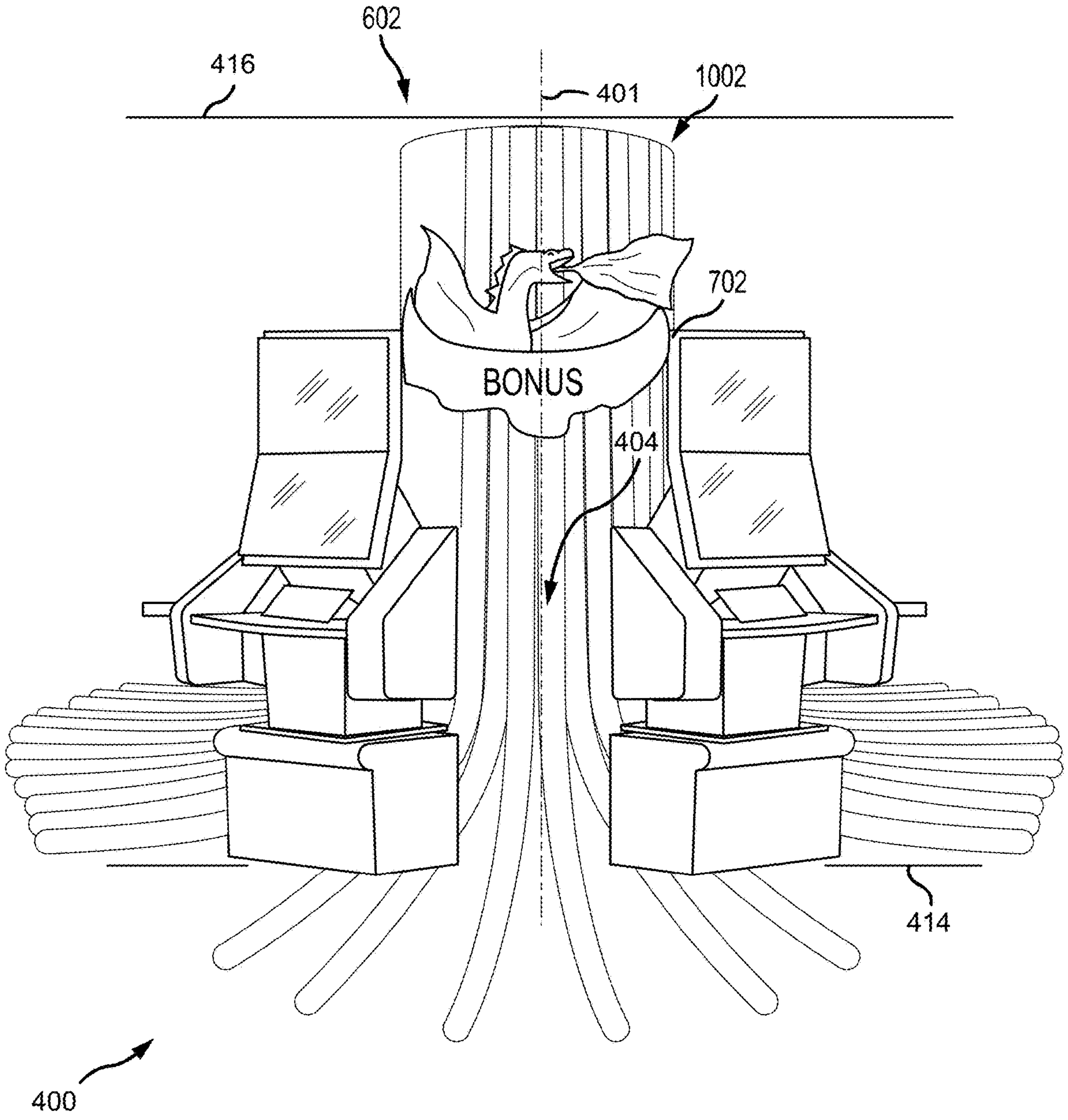
FIG. 10A is a perspective view of a second example flexible display mounted, at least in part, below a bank of electronic gaming machines.

FIG. 10A is a perspective view of a second example flexible display 1002 mounted relative to bank of EGMs 400. As shown, second example flexible display 1002 is shaped like an inverted funnel (e.g., the funnel of FIG. 3 in an upside down position). As a result, portions of flexible display 1002 extend over at least a portion of floor surface 414 any may, in some embodiments, even extend underfoot of a player or further extended on to more portions of floor surface 414. As shown in FIG. 10, flexible display 1002, including portions over floor surface 414) may be configured in strips spaced apart from each other, as a continuous display, or any other configuration.

Figure 10B:
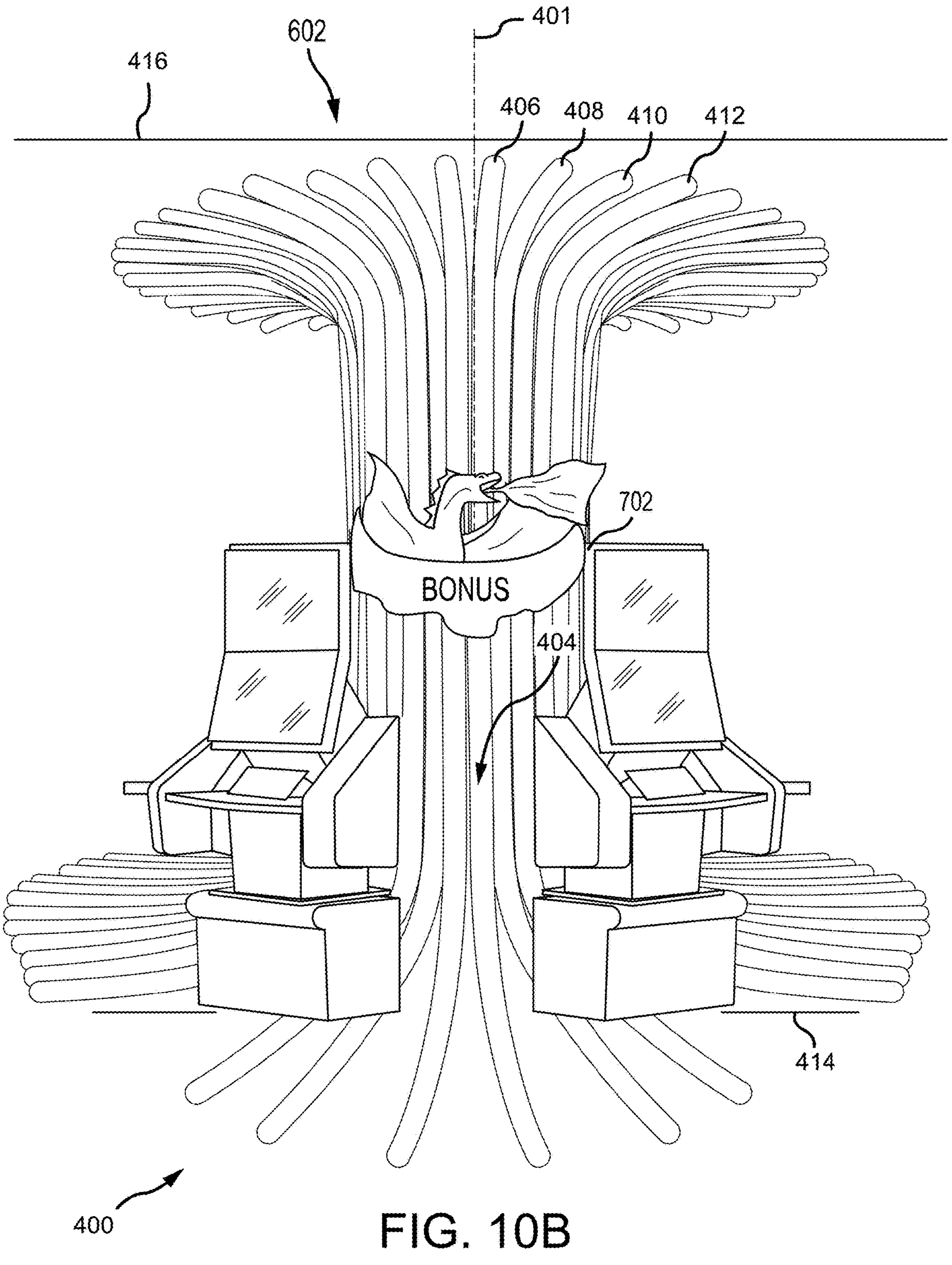
FIG. 10B is a perspective view of a modified second example flexible display mounted, at least in part, below a bank of electronic gaming machines.

In some embodiments, as shown in FIG. 10B, flexible display 1002 may extend on to floor surface 414 as well as including a wider upper portion. In these embodiments (not shown), a flexible display may be wide at top and bottom portions and narrow within interior portion 404 of bank of EGMs 400 (i.e., symmetrically funnel-shaped at a top and bottom portion). In some embodiments, flexible display 1002, or any flexible display described herein, may be coupled to a support component (e.g., similar to a turntable) configured to spin and/or control the flexible display to spin. In these embodiments, the flexible display may be configured to spin along with the support component. In yet another embodiment, a plurality of flexible display panels may be coupled and arranged, such as around a support structure, to create a lounge, pod, or room, the walls of which may generate display graphics and images. A user or player may physically enter the lounge or pod, such as through a doorway or porthole formed in the flexible display panels used to form the room or pod, whereupon the user may be substantially surrounded by a display on one or more sides. For example, in at least some embodiments, even a floor and ceiling may be formed from flexible display panels, in which case, the user may be completely surrounded by a flowing display to create a fully immersive display environment. In some embodiments, flexible display 1002 may extend laterally above a player area (e.g., the space directly above a player playing at an EGM of bank of EGMs 400). In some embodiments, flexible display 1002 may extend laterally below a player area (e.g., the space directly below a player playing at an EGM of bank of EGMs 400). In some embodiments, flexible display 1002 may extend laterally past the player area to a spectator area (e.g., a space where spectators watching gameplay on flexible display 1002 or an EGM of bank of EGMs 400 are positioned). Accordingly, flexible display 1002 may be configured to extend in to any portion of a player area and/or spectator area, as defined above, to further immerse players and/or spectators in gameplay on an EGM of bank of EGMs 400.

Figure 11:
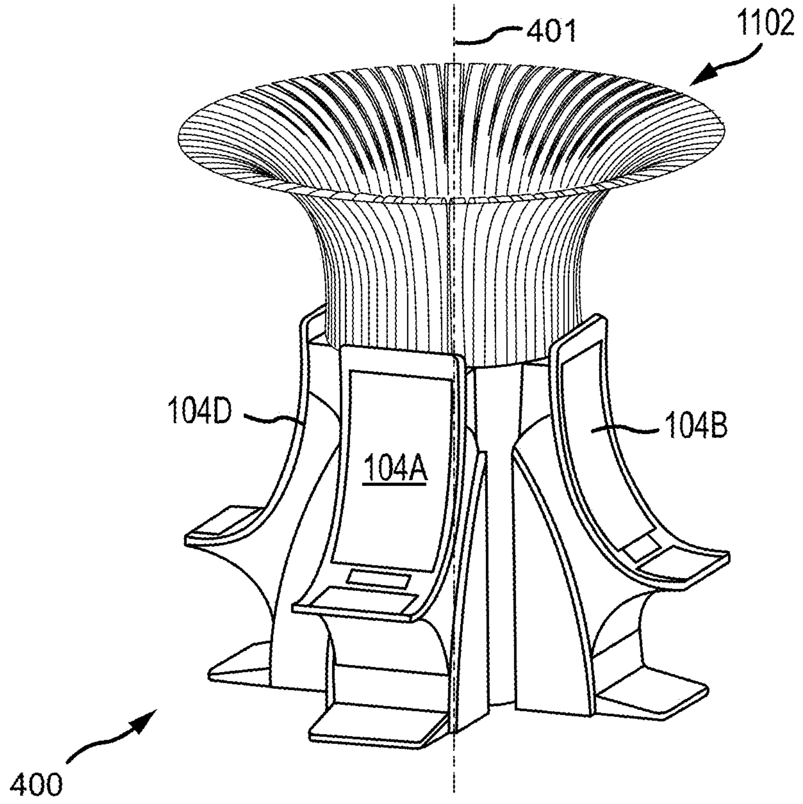
FIG. 11 is a perspective view of a third example flexible display mounted a bank of electronic gaming machines.

FIG. 11 is a perspective view of a third example flexible display 1102 mounted relative to bank of EGMs 400. As shown, third flexible display 1102 is funnel-shaped and includes many flexible display panels, each arranged concentrically about axis 401. However, other shapes, as described herein, and contemplated by and within the scope of the present disclosure. In this embodiment, EGMs 104A-104D are integral with or at least partially recessed within flexible display 1102.

Figure 12:
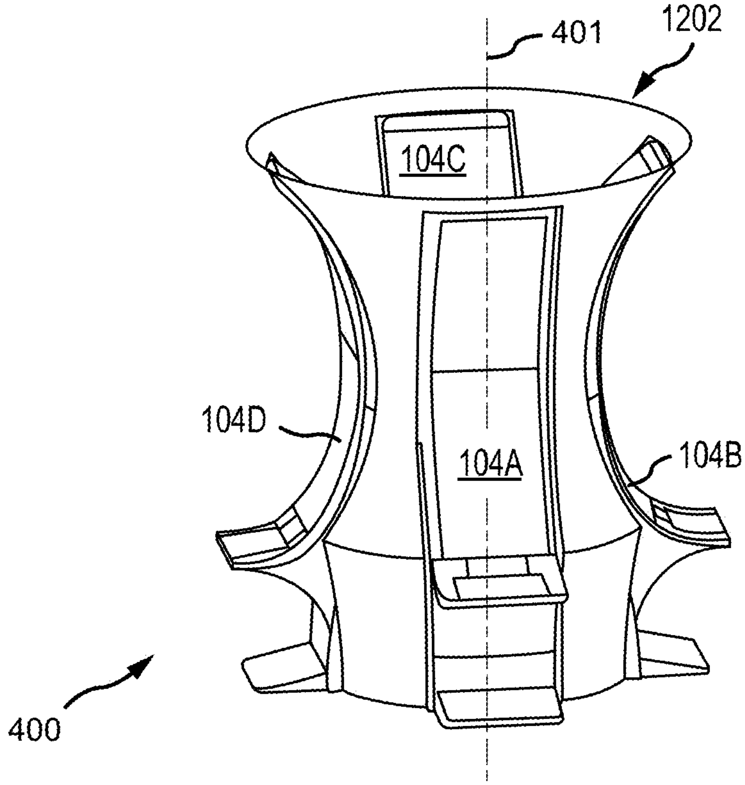
FIG. 12 is a perspective view of a fourth example flexible display mounted over a bank of electronic gaming machines.

FIG. 12 is a perspective view of a fourth example flexible display 1202 mounted relative to bank of EGMs 400. As shown, third flexible display 1202 is funnel-shaped on top and bottom portions. However, other shapes, as described herein, and contemplated by and within the scope of the present disclosure. In this embodiment, EGMs 104A-104D are integral with or at least partially recessed within flexible display 1202.

Figure 13:
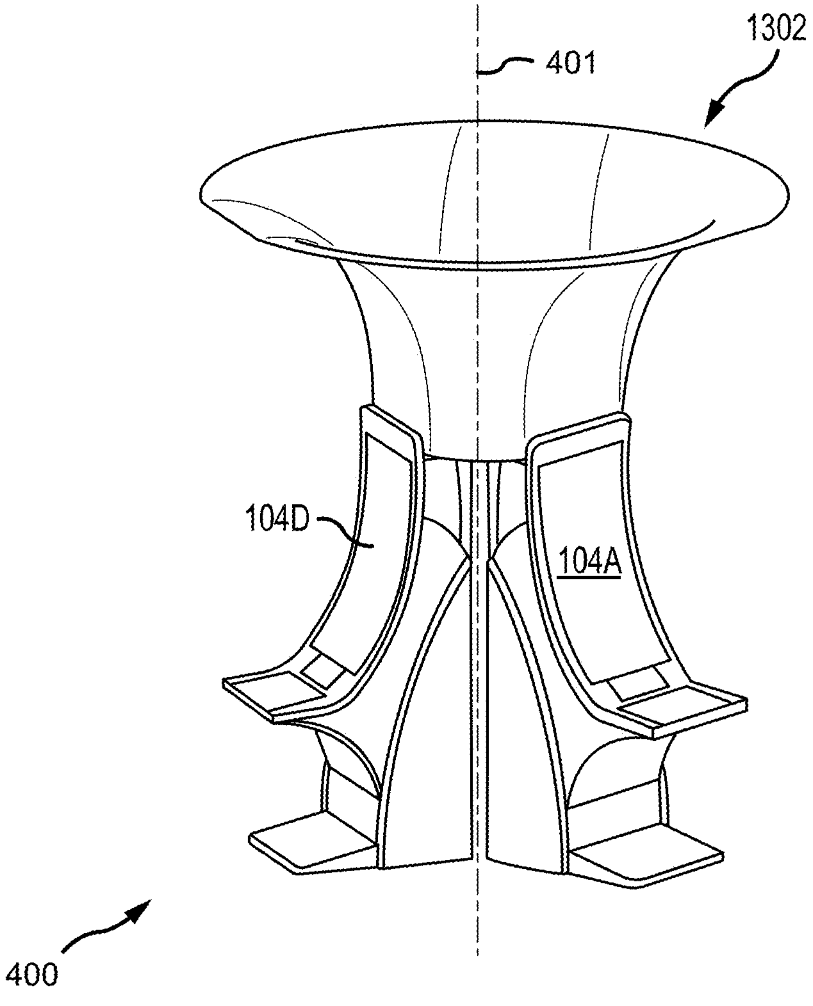
FIG. 13 is a perspective view of a fifth example flexible display mounted over a bank of electronic gaming machines.

FIG. 13 is a perspective view of a fifth example flexible display 1302 mounted relative to bank of EGMs 400. As shown, third flexible display 1302 is funnel-shaped. However, other shapes, as described herein, and contemplated by and within the scope of the present disclosure. In this embodiment, EGMs 104A-104D are integral with or at least partially recessed within flexible display 1302.

Thus, a flexible display configured to be mounted over a bank of electronic gaming machines is provided. The flexible display may be assembled from a plurality flexible display panels, each of which may include a plurality of light emitting diodes mounted on a flexible printed circuit board. The flexible display may be shaped as desired, and once assembled, each flexible display panel may be controlled by a respective electronic gaming machine, a server system, and/or in any other suitable manner, to display animated (or static) content, which may be game or casino related, on the flexible display.

In some embodiments, a flexible display may be in communication with a different flexible display (e.g., via a wired and/or wireless connection), and/or a plurality of flexible displays may be controlled by the same server (e.g., servers 106-114) or EGM (e.g., EGM 104A-104X). For example, content/animations displayed at one flexible display may be determined by content/animations displayed at a different flexible display (e.g., a bonus animation, such as a volcano eruption, may be displayed on a plurality of flexible displays upon a bonus being awarded at an EGM 104A-104X coupled to a flexible display). As another example, during play of a tournament game, more than one flexible display and bank of EGMs may be used. In this example, a tournament leader board may be displayed at each flexible display of each bank of EGMs being used to play the tournament game.

In some embodiments, any number of components may be coupled to and/or in communication with flexible display 402. For example, a fan and/or mister may be configured to be activated upon a particular animation being displayed on flexible display 402 (e.g., as controlled by a server and/or EGM as described herein). As another example, a component may be configured to drop confetti upon a particular animation being displayed on flexible display 402 (e.g., as controlled by a server and/or EGM as described herein).

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

a plurality of electronic gaming machines (EGMs), the plurality of EGMs spaced apart from a central axis by a distance and defining an interior portion therebetween; and a flexible display device extending from the interior portion to an overhead position above the plurality of EGMs, the flexible display device including a plurality of flexible display panels, each flexible display panel of the plurality of flexible display panels controlled by at least one EGM of the plurality of EGMs, wherein at least one flexible display panel comprises a first screen resolution at a first vertical position on the at least one flexible display panel and a second screen resolution at a second vertical position on the at least one flexible display panel.

2. The electronic gaming system of claim 1, wherein the flexible display device is configured to display a game animation on at least one flexible display panel of the plurality of flexible display panels when a game is being played on at least one EGM of the plurality of EGMs.

3. The electronic gaming system of claim 2, wherein the flexible display device is configured to display the game animation, the flexible display device further configured to display the game animation as traveling laterally around a circumference of the flexible display device.

4. The electronic gaming system of claim 2, wherein the at least one flexible display panel includes a flexible display panel positioned above the at least one EGM, the at least one flexible display panel being controlled by the at least one EGM.

5. The electronic gaming system of claim 2, wherein the at least one flexible display panel is configured to display a bonus game animation during play of a bonus game on the at least one EGM.

6. The electronic gaming system of claim 2, wherein the at least one flexible display panel is configured to display a tournament animation during play of a tournament game on the at least one EGM.

7. The electronic gaming system of claim 6, wherein the at least one flexible display panel is configured to display the tournament animation, the tournament animation including a virtual leaderboard comprising relative positions of players in a tournament associated with the tournament game.

8. The electronic gaming system of claim 1, wherein at least one flexible display panel of the plurality of flexible display panels is configured to display a bonus animation in response to a bonus being awarded at at least one EGM of the plurality of EGMs.

9. The electronic gaming system of claim 8, wherein the at least one flexible display panel is configured to display the bonus animation, the bonus animation being displayed proximate to the at least one EGM of the plurality of EGMs.

10. The electronic gaming system of claim 9, wherein the at least one flexible display panel is configured to display the bonus animation, the bonus animation being displayed on the at least one flexible display panel until a bonus is awarded at an EGM of the plurality of EGMs different from the at least one EGM of the plurality of EGMs.

11. The electronic gaming system of claim 1, wherein the electronic gaming system further comprises at least one camera communicatively coupled to at least one EGM of the plurality of EGMs.

12. The electronic gaming system of claim 11, wherein the at least one camera is configured to generate digital content in response to an award being presented at an EGM of the plurality of EGMs.

13. The electronic gaming system of claim 12, wherein at least one flexible display panel of the plurality of flexible display panels is configured to display the digital content generated by the camera in response to receiving the digital content.

14. The electronic gaming system of claim 1, wherein at least one flexible display panel of the plurality of flexible display panels is configured to vibrate in response to receiving a vibrate signal from at least one EGM of the plurality of EGMs.

15. The electronic gaming system of claim 1, wherein at least one flexible display panel of the flexible plurality of display panels is configured to display at least a portion of game play of a game played at at least one EGM of the plurality of EGMs.

16. The electronic gaming system of claim 1, wherein the flexible display device further extends downward from the interior portion such that at least a portion of the flexible display device is coupled to a floor.

17. The electronic gaming system of claim 16, wherein at least a portion of the flexible display device comprises touchscreen components.

18. The electronic gaming system of claim 17, wherein the touchscreen components include at least one infrared sensor, the at least one infrared sensor configured to detect objects in contact with the flexible display device.

19. The electronic gaming system of claim 1, wherein the electronic gaming system further comprises a second plurality of electronic gaming machines (EGMs) arranged concentrically around a second central axis, the second plurality of EGMs spaced apart from the second central axis by a distance and defining an interior portion therebetween; and a second flexible display device extending from the interior portion to an overhead position above the second plurality of EGMs, the second flexible display device including a second plurality of flexible display panels, each flexible display panel of the second plurality of flexible display panels controllable by at least one EGM of the second plurality of EGMs.

20. The electronic gaming system of claim 1, wherein the flexible display device comprises a substantially tubular shape comprising a height and a circumference, wherein the circumference varies over the height of the flexible display device.

* * * * *